United States Patent
Kimura

(10) Patent No.: US 10,483,785 B2
(45) Date of Patent: Nov. 19, 2019

(54) POWER INFORMATION MANAGEMENT DEVICE AND POWER INFORMATION MANAGEMENT SYSTEM

(71) Applicant: RICOH IMAGING COMPANY, LTD., Tokyo (JP)

(72) Inventor: Yoshitaka Kimura, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 177 days.

(21) Appl. No.: 15/357,258

(22) Filed: Nov. 21, 2016

(65) Prior Publication Data

US 2017/0163074 A1 Jun. 8, 2017

(30) Foreign Application Priority Data

Dec. 3, 2015 (JP) ................................ 2015-236210

(51) Int. Cl.
*H02J 7/02* (2016.01)
*H02J 13/00* (2006.01)
*H02J 7/00* (2006.01)

(52) U.S. Cl.
CPC ............ *H02J 7/025* (2013.01); *H02J 13/002* (2013.01); *H02J 7/027* (2013.01); *H02J 2007/0096* (2013.01)

(58) Field of Classification Search
CPC ...................................................... H02J 7/025
USPC ........................................................ 320/108
See application file for complete search history.

(56) References Cited

U.S. PATENT DOCUMENTS

| | | | |
|---|---|---|---|
| 6,760,566 B1 * | 7/2004 | Wright | H04B 7/18513 370/318 |
| 9,811,133 B2 * | 11/2017 | Cudak | G06F 1/26 |
| 2006/0203997 A1 * | 9/2006 | Bailey | H04M 1/738 379/413 |
| 2013/0232223 A1 * | 9/2013 | Ma | H04L 67/2814 709/217 |

(Continued)

FOREIGN PATENT DOCUMENTS

| | | |
|---|---|---|
| JP | 2003-44179 | 2/2003 |
| JP | 2008-165818 A | 7/2008 |
| JP | 2013-226022 A | 10/2013 |

OTHER PUBLICATIONS

Apr. 10, 2019 Notice of Reasons for Refusal in counterpart Japanese application No. 2015-236210 and English translation thereof.

*Primary Examiner* — Jerry D Robbins
(74) *Attorney, Agent, or Firm* — Greenblum & Bernstein, P.L.C.

(57) ABSTRACT

There is provided a power information management device communicable with at least one another device and being able to perform one of mutual power supply and unidirectional power supply, comprising: a requesting unit configured to send a request for information concerning electric power to the at least one another device; a receiving unit configured to receive the power information from the at least one another device which has received the request; and a generating unit configured to generate power information concerning electric power of a plurality of devices including the power information management device and the at least one another device based on the information received from the at least one another device.

8 Claims, 4 Drawing Sheets

(56) References Cited

U.S. PATENT DOCUMENTS

2015/0346792 A1* 12/2015 Rathi ............... G06F 1/266
                                                    713/310
2017/0045932 A1*  2/2017 Bostick ............ G06F 1/3296

* cited by examiner

Power information management

[Device 10]
    Internal battery residual quantity: 1000mWh
    Power consumption(mode 1): xxxmW
    Internal battry life: 80% 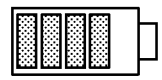
    ...
    Total battery residual quantity: 5000mWh
    Total quantity battery life: 400% 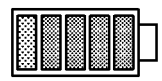
    ...
    Installed communication standard:
        Wifi/Bluetooth/USBtypeC(Profile3)...
    ...

[Device 20]
    Internal battery residual quantity: 2000mWh
    Power consumption(mode 1): xxxmW
    Internal battry life: 100% 
    External battery residual quantity: 3000mWh
    External quantity battery life: 150% 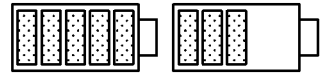
    ...
    Installed communication standard: Wifi/USBtypeC(Profile5)...
    Transmission effeciency: DEVICE 20→DEVICE 10: 98%
    ...

[Device 30]
    Internal battery residual quantity: 2000mWh
    Power consumption(mode 1): xxxmW
    Internal battry life: 50% 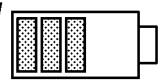
    External battery residual quantity: 3000mWh
    External quantity battery life: 150% 
    ...
    Installed communication standard:
        Wifi/Bluetooth/USBtypeC(Profile2)...
    Transmission effeciency: DEVICE 30→DEVICE 10: 85%
    Transmission rate: DEVICE 10→DEVICE 30: 30min
    ...

FIG. 4

POWER INFORMATION MANAGEMENT DEVICE AND POWER INFORMATION MANAGEMENT SYSTEM

BACKGROUND OF THE INVENTION

The present invention relates to a power information management device and a power information management system for managing power information.

A power supply device capable of supplying electric power to other devices is known. A power supply device of this type is described, for example, in Japanese Patent Provisional Publication No. 2003-44179A (hereafter, referred to as patent document 1).

The power supply device described in the patent document 1 is configured to judge whether it is possible to supply required electric power to one device of other devices based on data concerning a required electric power received from the one device. When the power supply device judges that it is impossible to supply the required electric power to the one device, the power supply device monitors a power state in the power supply device until supply of the required electric power becomes possible. When it becomes possible to supply the required electric power to the one device, the power supply device supplies electric power to the one device after issuing a bus reset.

SUMMARY OF THE INVENTION

However, the power supply device described in the patent document 1 merely supplies electric power at the timing when supply to the required power to the one device becomes possible. Therefore, the power supply device is not able to supply or receive electric power while reflecting user's intention and is not able to supply or receive electric power flexibly while considering a power status of each of other devices.

The present invention is advantageous in that it provides at least one of a power information management device and a power information management system adapted to supply or receive electric power while reflecting user's intention or to supply or receive electric power flexibly while considering a power status of each of other devices.

According to an aspect of the invention, there is provided a power information management device communicable with at least one another device and being able to perform one of mutual power supply and unidirectional power supply. The power information management device comprises: a requesting unit configured to send a request for information concerning electric power to the at least one another device; a receiving unit configured to receive the power information from the at least one another device which has received the request; and a generating unit configured to generate power information concerning electric power of a plurality of devices including the power information management device and the at least one another device based on the information received from the at least one another device.

With this configuration, it becomes possible to supply and receive electric power while reflecting user's intention or to supply and receive electric power flexibly while considering a power status of each of other devices.

In at least one aspect, the power information concerning the plurality of devices may include at least one of:
a residual quantity of electric power of each device of the plurality of devices;
a first total residual quantity being a sum of residual quantities of electric power of each device of the plurality of devices;
a radio between a full charge capacity of one device of the plurality of devices and the first total residual quantity;
a second total residual quantity being a sum of residual quantities of electric power of the plurality of devices other than one device;
a ratio between a full charge capacity of one device of the plurality of devices and the second total residual quantity;
power consumption of each device of the plurality of devices;
a communication standard supported by each device of the plurality of devices;
information concerning power transmission efficiency between the plurality of devices;
information concerning power transmission rate between the plurality of devices; and
a number of cable connection terminals provided in each of the plurality of devices, the cable connection terminals being used to perform one of the mutual power supply and unidirectional power supply.

In at least one aspect, the power information management device may further comprise a display unit configured to display the power information concerning electric power of the plurality of devices generated by the generating unit on a display screen.

In at least one aspect, the power information management device may further comprise a communication unit configured to pair the power information management device with the at least one another device in accordance with a predetermined communication standard. In this case, the information concerning electric power may be transmitted between the power information management device and the at least one another device in accordance with the predetermined communication standard.

In at least one aspect, the requesting unit may be configured to send the request for the information concerning electric power to the at least one another device when a predetermined trigger condition is satisfied.

In at least one aspect, the power information management device may further comprise a transmitting unit configured to transmit the power information concerning the plurality of devices generated by the generating unit to the at least one another device.

In at least one aspect, the power information management device may perform one of the mutual power supply and unidirectional power supply with respect to the at least one another device via wired connection or wireless connection.

According to another aspect of the invention, there is provided a power information management system, comprising: one of the above described power information management devices; and at least one another device that transmits information concerning electric power in response to a request from the power information management device.

With this configuration, it becomes possible to supply and receive electric power while reflecting user's intention or to supply and receive electric power flexibly while considering a power status of each of other devices.

BRIEF DESCRIPTION OF THE ACCOMPANYING DRAWINGS

FIG. 4 illustrates a screen example displayed on a display screen of a device in step S19 in FIG. 2.

DETAILED DESCRIPTION OF THE EMBODIMENTS

Hereinafter, a power information management system according to an embodiment of the invention is described with reference to the accompanying drawings.

Figure 1:
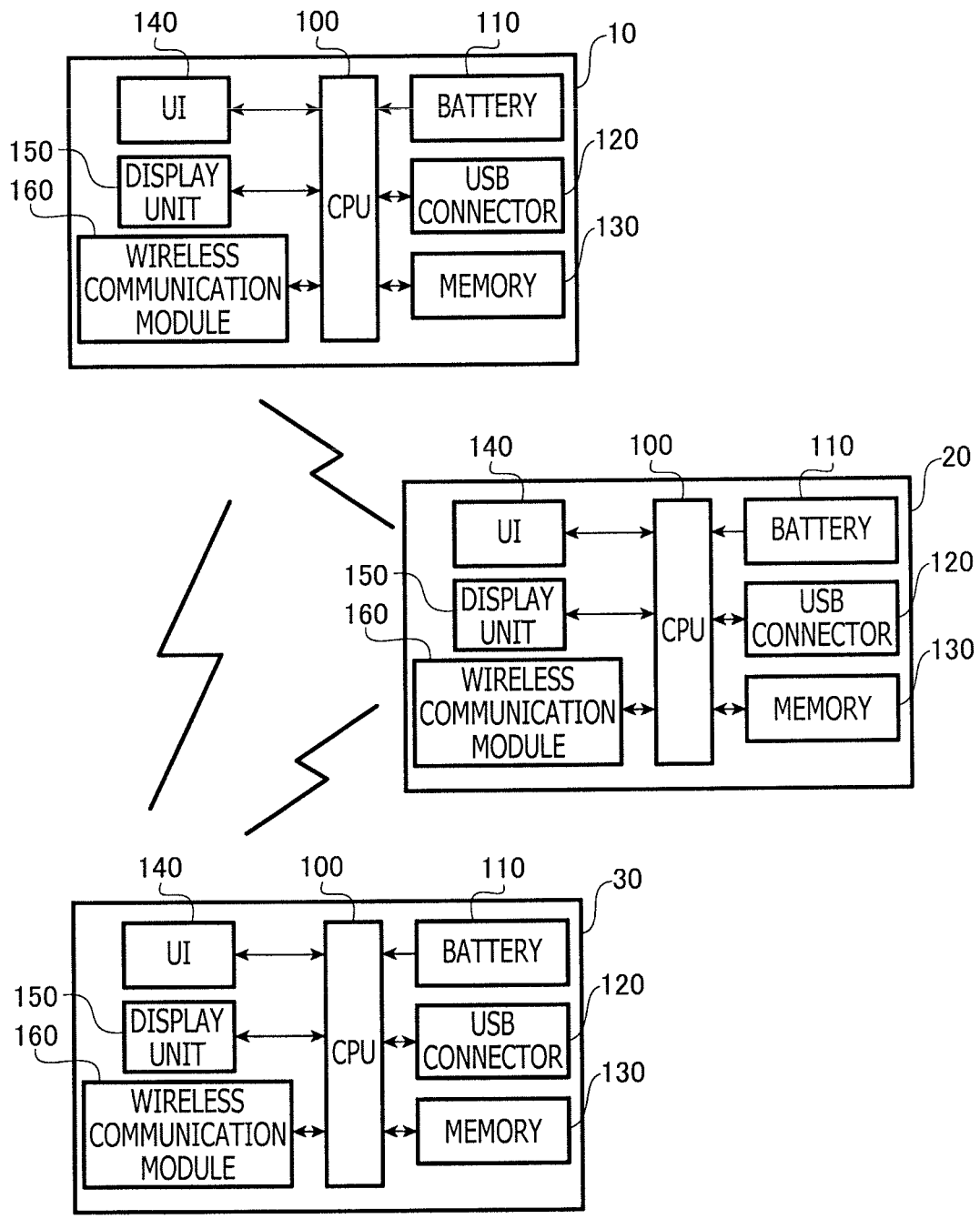
FIG. 1 is a block diagram illustrating a configuration of a power information management system according an embodiment of the invention.

FIG. 1 is a block diagram illustrating a configuration of a power information management system 1 according the embodiment of the invention. The power information management system 1 includes a plurality of devices (at least two devices) capable of communicating with each other. In an example shown in FIG. 1, the power information management system 1 includes three devices (a device 10, a device 20 and a device 30).

The devices constituting the power information management system 1 have been paired in advance in accordance with a wireless communication standard, such as, Bluetooth™ or Wi-Fi, and are automatically connected wirelessly when the devices move into a range where mutual wireless communication is available. The devices constituting the power information management system 1 are able to supply or receive electric power in accordance with results of mutual communication, and exemplarily each device constituting the power information management system 1 is a device which supports USB (Universal Serial Bus)—PD (Power Delivery). As an example, the device is a digital single-lens reflex camera, a mirrorless single-lens camera, a compact digital camera, a video camera, a camcorder, a desktop PC, a notebook PC, a table terminal, an PHS (Personal Handy Phone System), a smartphone, a smartwatch, a feature phone, a game machine, an audio player, a TV, a car navigation, a projector, a peripheral device such as a printer or a storage, a flash device, a GPS unit and an accessory such as an external finder.

As shown in FIG. 1, each of the devices 10 to 30 includes a CPU 100, a battery 110, a USB connector 120, a memory 130, a UI (User Interface) 140, a display unit 150 and a wireless communication module 160. For convenience of explanation, in this embodiment, components (e.g., a solid-state image pickup device or a photographing lens in the case where the device is a photographing device, an HDD in the case where the device is a desktop PC, a flash lamp or trigger circuit in the case where the device is a flash device) unique to a particular device or general components such as a housing well known in the art are not explained or are simply explained.

The UI 140 of each of the devices 10 to 30 includes various operating units for allowing a user to operate the device. For example, when the UI 140 (e.g., a power switch) is operated by the user, electric power is supplied from the battery 110 to various circuit in the device via power lines. It should be noted that a power supply source of each of the devices 10 to 30 is not limited to the battery 110, but may be a commercial power supply.

When the CPU 100 receives electric power from the battery 110, the CPU 100 totally controls the device by accessing the memory 130 to read a control program, loading the control program onto a work area, and executing the loaded control program. On a display screen of the display unit 150, various screens, such as, execution results of the control program or an operation menu are displayed.

The devices 10 to 30 are able to communicate with each other via the wireless communication modules 160 thereof, and are also able to communicate with each other via USB cables connected to the USB connectors 120. The USB connector 120 is a connector which supports the USB-PD, and is, for example, a USB Type-C connector. The USB cable is a cable which supports the USB-PD, and is, for example, a USB Type-C cable. Therefore, in addition to being able to communicate with each other via the USB cables, the devices 10 to 30 are able to perform mutual power supply or unidirectional power supply via the USB cables. When the devices are connected via the USB cables, a host device (a power supply side) is defined automatically or in response a user operation. As an example, when the device 10 and the device 20 are connected via the USB cable, the device 20 is defined as a host device. The CPU 100 of the device 10 issues a power supply request to the host device (the device 20) automatically or in response to a user operation.

The CPU 100 of each of the devices 10 to 30 holds a plurality of types of electric power profiles defining electric power to be supplied to other devices. The followings are examples of electric power profiles which the CPU 100 holds.

(Example of Electric Power Profile)

| PROFILE | POWER | VOLTAGE | CURRENT |
| --- | --- | --- | --- |
| PROFILE 0 | | RESERVED | |
| PROFILE 1 | 10 W | 5 V | 2 A |
| PROFILE 2 | 18 W | 12 V | 1.5 A |
| PROFILE 3 | 36 W | 12 V | 3 A |
| PROFILE 4 | 60 W | 20 V | 3 A |
| PROFILE 5 | 100 W | 20 V | 5 A |

When the CPU 100 of the device 20 receives a power supply request from the device 10, the CPU 100 of the device 20 subtracts an operating power required for the device 10 from the electric power being supplied from the battery 110 or the commercial power supply, and selects a power profile satisfying the subtracted power value. As an example, let us consider a case where the electric power supplied from the battery 110 is 100 W and the operating power of the device 20 is 60 W. In this case, the CPU 100 selects the power profiles 0 to 3 having a power lower than or equal to 40 W (=100 W−60 W) from among the above listed power profiles, and notifies the device 10 of the selected power profiles 0 to 3 as available power profiles.

The CPU 100 of the device 10 calculates an operating power required to stably operate the device 10 in accordance with a current operating mode or a current status, and designates an optimal power profile according to the calculation result from among the power profiles 0 to 3 contained in a notification from the device 20. Then, the CPU 100 of the device 10 notifies the device 20 of the designated power profile.

The CPU 100 of the device 20 supplies an electric power according to the power profile designated by the device 10 to the device 10 via the USB cable. The device 10 operates with the electric power received from the device 20.

(Power Information Updating Process)

Figure 2:
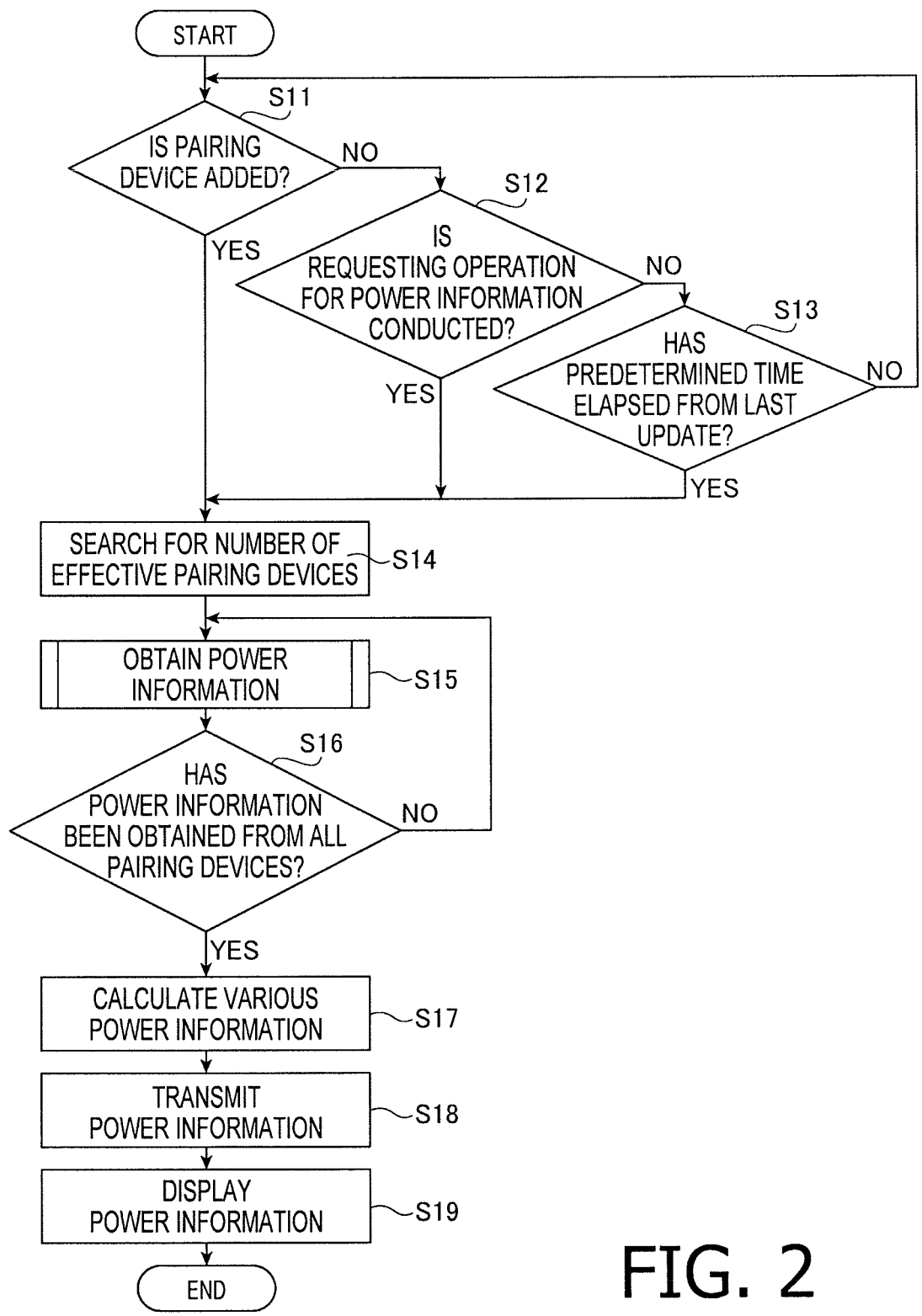
FIG. 2 is a flowchart illustrating a power information updating process executed by a device according to the embodiment of the invention.

FIG. 2 is a flowchart illustrating a power information updating process executed by the CPU 100 of the device 10 according to the embodiment of the invention. A device which executes the power information updating process is not limited to the device 10, but may be another device such as the device 20 or the device 30. As an example, the power information updating process may be executed by a device set by a user or by a device of which power consumption in a standby state is smallest of all of the devices in the power information management system 1. Such a device of which power consumption in the standby state is smallest may be automatically detected from a plurality of devices, for example, based on communication results between the devices.

(S11 in FIG. 2 (Judgment on Addition of Pairing Device))
In step S11, it is judged whether or not a pairing device is newly registered in the device 10.

(S12 in FIG. 2 (Judgment on User Operation))
Step S12 is executed when it is judged in step S11 (additional judgment on pairing device) that a pairing device is not newly registered (S11: NO). In step S12, it is judged whether or not an operation for requesting update of the power information is conducted by a user.

(S13 in FIG. 2 (Judgment on Time Lapse))
Step S13 is executed when it is judged in step S12 (judgment on user operation) that an operation for requesting update of the power information is not conducted (S12: NO). In step S13, it is judged whether or not a predetermined time has elapsed from the time when update of the power information is executed last time. The predetermined time may be set by a user.

(S14 in FIG. 2 (Search for Number of Effective Pairing Device))
Step S14 is executed when a predetermined triggering condition is satisfied. Specifically, step S14 is executed when it is judged in step S11 (judgment on addition of pairing device) that a pairing device is newly registered (S11: YES), when it is judged in step S12 (judgment on user operation) that an operation for requesting update of the power information is conducted (S12: YES), or when it is judged in step S13 (judgment on time lapse) that a predetermined time has elapsed from the time when update of the power information is executed last time (S13: YES). As another type of triggering condition, a case where a pairing device which has been already paired enters into a range where wireless communication is available.

In step S14, the number of pairing devices with which wireless communication is currently possible (pairing devices currently existing within the range where wireless communication is possible) is searched. In the example shown in FIG. 1, two devices (i.e., the device 20 and the device 30) are searched. In the following, for convenience of explanation, the pairing device searched here is referred to as a "pairing device (wirelessly communicable device)".

Figure 3:
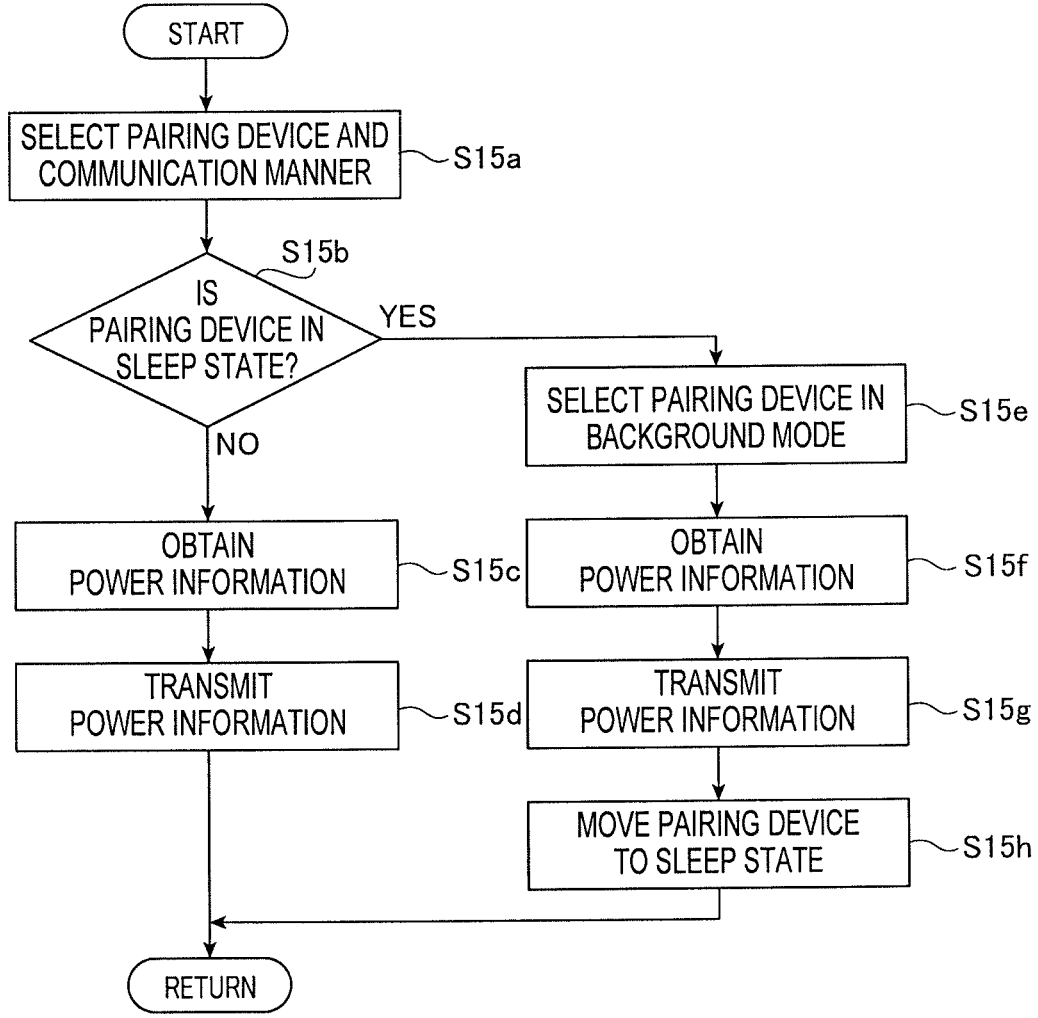
FIG. 3 is a flowchart illustrating details of step S15 in FIG. 2.

(S15 in FIG. 2 (Obtaining of Power Information))
FIG. 3 is a flowchart illustrating details of step S15 (obtaining of power information).

(S15*a* in FIG. 3)
In step S15*a*, one device is selected in predetermined order from among the pairing devices (wirelessly communicable devices), and the wireless communication manner of the wireless communication module 160 is switched in conformity with the wireless communication standard supported by the selected pairing device (wirelessly communicable device). In steps 15*a*, when there are more than one wireless communication standards supported mutually by the devices, the wireless communication manner is switched to one considered to be optimum by totally considering conditions including the communication rate and the electric power required for the communication. The "predetermined order" may be, for example, the order in which a device is registered as a pairing device or the order of ascending current processing load. Step S15 may be executed concurrently for a plurality of deices supporting different types of wireless communication standards (e.g., a total of two devices: one supporting Bluetooth™ and the other supporting Wi-Fi).

(S15*b* in FIG. 3)
In step S15*b*, it is judged whether or not the pairing device (wirelessly communicable device) selected in step S15*a* is in a sleep state. The term sleep state used herein means a state where only a part of functions (at least a communication function of communicating with another device) of a device is available.

(S15*c* in FIG. 3)
Step S15*c* is executed when it is judged in step S15*b* that the pairing device (wirelessly communicable device) is not in the sleep state (S15*b*: NO). In step S15*c*, power information concerning electric power is obtained from the pairing device (wirelessly communicable device) selected in step S15*a*.

As an example, the device 10 issues an acquisition request for the power information with respect to the pairing device (wirelessly communicable device) selected in step S15*a*. The pairing device (wirelessly communicable device) monitors the residual quantity of its own battery 110, and periodically stores the residual quantity in the memory 130. The pairing device (wirelessly communicable device) which has received the acquisition request transmits, to the device 10, the power information (exemplified below) concerning supply and reception of electric power. The device 10 receives and obtains the power information.

Residual quantity of internal battery (unit: mWh)
Latest residual quantity of its own battery 110 stored in its own memory 130
Power consumption (unit: mW)
Its own power consumption in the current operation mode (e.g., mode 1)
Internal battery life (unit: %)
A value obtained by dividing the residual quantity of its own internal battery by the overall capacity (full charge capacity) of its own battery 110 and by multiplying the result of the division by 100.
Information generally concerning physical and logical protocols related to its own communication and power transmission (e.g., supported communication standard and electric power transmission standard)
The number of its own USB connectors 120
S15*d* in FIG. 3
In step S15*d*, the power information obtained from the pairing device (wirelessly communicable device) in step S15*c* is transmitted to each pairing device (wirelessly communicable device) in the power information management system 1. The power information concerning the device 10 is also transmitted to each pairing device (wirelessly communicable device) in the power information management system 1. As a result, the power information is transmitted and received in the power information management system 1 and is shared. It should be noted that the power information concerning the device 10 is transmitted to each pairing device (wirelessly communicable device) only when step S15*d* or step S15*g* which is described later is executed first time.

In the flowchart shown in FIG. 3, in order to reduce communication traffic, the power information may be transmitted and received between the devices such that only a difference with respect to the power information transmitted/received last time is transmitted/received between devices.

S15e in FIG. 3

Step S15e is executed when it is judged in step S15b that the pairing device (wirelessly communicable device) is in the sleep state (S15b: YES). In step S15e, a command is issued for the pairing device (wirelessly communicable device) selected in step S15a. As a result, the pairing device (wirelessly communicable device) is started in a background mode. It should be noted that, considering visibility for users, an indicator such as one indicating "transmitting" may be displayed on the pairing device (wirelessly communicable device) started in the background mode. Since communication of the pairing device (wirelessly communicable device) is executed in the background mode, the pairing device (wirelessly communicable device) is driven in a power saving state.

S15f in FIG. 3

In step S15f, the power information (the information similar to that explained in step S15c) is obtained from the pairing device (wirelessly communicable device) started in the background mode in step S15e.

S15g in FIG. 3

In step S15g, the power information obtained from the pairing device (wirelessly communicable device) in step S15f is transmitted to each pairing device (wirelessly communicable device) in the power information management system 1. The power information concerning the device 10 is also transmuted to each pairing device (wirelessly communicable device) in the power information management system 1. As a result, the power information is transmitted and received in the power information management system 1 and is shared.

S15h in FIG. 3

In step S15h in FIG. 3, a command is issued with respect to the pairing device (wirelessly communicable device) started in the background mode in step S15e. As a result, the pairing device (wirelessly communicable device) moves to the sleep mode.

S16 in FIG. 2 (Judgment on Completion of Obtaining of Power Information)

In step S16, it is judged whether or not step S15 (obtaining of power information) has been executed for all the pairing devices (wirelessly communicable devices) in the power information management system 1, i.e., whether or not the power information has been obtained from all the pairing devices (wirelessly communicable devices). When a pairing device (wirelessly communicable device) from which the power information is not obtained remains (S16: NO), the process returns to step S15 (obtaining of power information) and the obtaining process for a next pairing device (wirelessly communicable device) is executed.

S17 in FIG. 2 (Calculation of Various Power Information)

Step S17 is executed when it is judged in step S16 (judgment on completion of obtaining of power information) that the power information is obtained from all the pairing devices (wirelessly communicable devices) (S16: YES). In step S17, the power information concerning supply and reception of electric power indicated as examples below is calculated. It should be noted that, in order to avoid concentration of the processing load on the device 10, the device 10 may share calculation of the various power information with the pairing device (wirelessly communicable device). In this embodiment, the various power information is calculated after the power information is obtained from all the pairing devices in the power information managing device 1. However, in another embodiment, the various power information may be calculated while obtaining power information from each pairing device (wirelessly communicable device).

Total Battery Residual Quantity (unit: mWh)

A sum of residual quantities of internal batteries of the device 10 and all the pairing devices (wirelessly communicable devices) in the power information management system 1

Total Quantity Battery Life (unit: %)

A value calculated by multiplying, by 100, a value obtained by dividing the total battery residual quantity by the overall capacity of the battery 110 of a target device. This value is calculated for each device (a target device) of the device 10 and all the pairing devices (wirelessly communicable devices) in the power information management system 1.

External Battery Residual Quantity (unit: mWh)

A sum of residual quantities of internal battery quantities of the device 10 and all the pairing devices (wirelessly communicable devices) in the power information management system 1 excepting a target device. This value is calculated for each device (target device).

External Quantity Battery Life (unit: %)

A value calculated by multiplying, by 100, a value obtained by dividing the external battery residual quantity by the overall capacity of the battery 110 of a target device. This value is calculated for each device (a target device) of the device 10 and all the pairing devices (wirelessly communicable devices) in the power information management system 1.

Transmission Efficiency and Transmission Rate of Electric Power between Devices

This information is calculated based on information concerning physical and logical protocols for communication and power transmission between devices. As a result, information, such as an optimum power profile, how to define devices serving to supply and receive electric power in order to efficiently supply power, a time required to supply electric power, can be obtained.

Proposal to User

Supplemental information, such as information for presenting a most effective device defined when electric power is supplied (e.g., a device of which the time required for supply power is shortest or a device of which the power transmission efficiency is highest (a device of which loss of power during power transmission is lowest)), or information for recommending power supply from a device having a sufficient residual quantity of the battery 110.

S18 in FIG. 2 (Transmission of Power Information)

In step S18, the various power information calculated in step S17 (calculation of various power information) is transmitted to each pairing device (wirelessly communicable device) in the power information management system 1. As a result, the power information is transmitted and received in the power information management system 1 and is shared.

S19 in FIG. 2 (Representation of Power Information)

FIG. 4 illustrates a screen example displayed on a display screen of the display unit 150 in step S19. As shown in FIG. 4, in step S19, the power information obtained in step S15c or step S15f and the power information calculated in step S17 (calculation of various power information) are displayed on the display screen of the display unit 150. For example, the power information may be displayed in different styles (in different colors, different fonts, etc.) for respective various items to enhance visibility for users.

To provide further details about the screen example in FIG. 4, an icon of "Total quantity battery life" shows the residual quantity level with the maximum scales of five. As shown in FIG. 4, the icon of "Total quantity battery life" is displayed in a style where one scale of the five scales is differentiated in color, pattern or lightness with respect to the other four scales. This example illustrates a ratio of the "Internal battery life (80%)" with respect to the "Total quantity battery life (400%)".

An icon of "External quantity battery life" in a field of the device 20 is represented with respect to the battery 110 of the device 20. Specifically, as shown in FIG. 4, the "External quantity battery life" in the field of the device 20 is 150%, which shows the quantity corresponding to one and a half of the battery 110 of the device 20. Therefore, the "External quantity battery life" in the field of the device 20 is represented by an icon showing a residual quantity of 100% and an icon showing a residual quantity of 50%.

By referring to the various power information displayed on the display screen of the display unit 150, a user is able to appropriately determine a device from which electric power should be transmitted and a device to which the electric power should be supplied, and a timing when the electric power should be supplied. That is, according to the embodiment, it becomes possible to supply and receive electric power while reflecting the user's intention and to supply and receive electric power flexibly while considering the power status of each device.

The foregoing is the explanation about specific configuration according to the embodiment of the invention; however, the present invention is not limited to the above described configuration and can be varied in various ways within the scope of the invention. For example, embodiments according to invention include a combination of embodiments explicitly described in this specification and embodiments easily realized from the above described embodiment.

In the above described embodiment, transmission and reception of information such as the power information is performed between devices by wireless communication not by wired communication; however, transmission and reception of information such as the power information may be performed between devices by wired communication.

In the above described embodiment, wired power transmission is performed; however, in another embodiment, wireless power transmission may be performed.

This application claims priority of Japanese Patent Application No. P2015-236210, filed on Dec. 3, 2015. The entire subject matter of the applications is incorporated herein by reference.

What is claimed is:

1. A power information management device communicable with at least one other device and being able to perform one of mutual power supply and unidirectional power supply, comprising:
 a processor that sends a power-profile request to the at least one other device, requesting transmission of the power profiles, each specifying a value of electric power the power information management device is allowed to request the at least one other device to transmit, and no greater than the difference between the electric power supplied to the power information management device and the operating power of the power information management device,
 the processor receiving the requested power profiles from the at least one other device in response to the sending of the power-profile request,
 wherein the power profiles relate to power information of a plurality of devices including the power information management device and the at least one other device, and
 wherein the received power profiles include at least one of:
  a ratio between a full charge capacity of one device of the plurality of devices and a sum of residual quantities of electric power of each device of the plurality of devices, and
  a ratio between a full charge capacity of one device of the plurality of devices and a sum of residual quantities of electric power of the plurality of devices other than one device;
 the processor selecting one of the received power profiles as an optimal power profile based on a current operating mode or a current status of the power information management device;
 the processor sending a request to the at least one other device for the transmission of the selected optimal power profile; and
 the processor receiving electric power transmitted from the at least one other device corresponding to the electric power specified in the optimal power profile sent to the at least one other device.

2. The power information management device according to claim 1, the power profiles relating to power information of a plurality of devices including the power information management device and the at least one other device,
 wherein the received power profiles include at least one of:
  a residual quantity of electric power of each device of the plurality of devices;
  a first total residual quantity being a sum of residual quantities of electric power of each device of the plurality of devices;
  a ratio between a full charge capacity of one device of the plurality of devices and the first total residual quantity;
  a second total residual quantity being a sum of residual quantities of electric power of the plurality of devices other than one device;
  a ratio between a full charge capacity of one device of the plurality of devices and the second total residual quantity;
  power consumption of each device of the plurality of devices;
  a communication standard supported by each device of the plurality of devices;
  information concerning power transmission efficiency between the plurality of devices;
  information concerning power transmission rate between the plurality of devices; and
  a number of cable connection terminals provided in each of the plurality of devices, the cable connection terminals being used to perform one of the mutual power supply and unidirectional power supply.

3. The power information management device according to claim 1, further comprising a display screen configured to display the received power profiles.

4. The power information management device according to claim 1, further comprising a Wi-Fi or Bluetooth communication module, or a USB connector configured to pair the power information management device with the at least one other device in accordance with a predetermined communication standard,
 wherein the power profiles are transmitted between the power information management device and the at least one other device in accordance with the predetermined communication standard.

5. The power information management device according to claim 1, wherein the processor is configured to send the request for the power profiles to the at least one other device when a predetermined trigger condition is satisfied.

6. The power information management device according to claim 1, further comprising a wireless communication module and a USB connector connected thereto, the wireless communication module and the USB connector being connected to the processor, the processor instructing the wireless communication module to transmit the power profile request and the selected optimum power profile request to the at least one other device.

7. The power information management device according to claim 1, wherein the power information management device performs one of the mutual power supply and unidirectional power supply with respect to the at least one other device via wired connection or wireless connection.

8. A power information management system, comprising:
   the power information management device according to claim 1; and
   the least one other device according to claim 1 that transmits the requested power profiles in response to the power-profile request from the power information management device.

\* \* \* \* \*